United States Patent
Huang et al.

(10) Patent No.: US 11,521,033 B2
(45) Date of Patent: Dec. 6, 2022

(54) ANTI-COUNTERFEITING IMAGE CODE EMBEDDED IN A DECORATIVE PATTERN OF A CERAMIC TILE AND ANTI-COUNTERFEITING METHOD THEREOF

(71) Applicants: DONGGUAN CITY WONDERFUL CERAMICS INDUSTRIAL PARK CO., LTD., Guangdong (CN); JIANGXI HEMEI CERAMICS CO., LTD., Jiangxi (CN)

(72) Inventors: Jiaqi Huang, Guangdong (CN); Zhengqiang Sheng, Guangdong (CN); Yuezeng Xie, Guangdong (CN); Zhiyong Ou, Guangdong (CN); Duanxu Cao, Guangdong (CN); Yanjun Li, Guangdong (CN)

(73) Assignees: DONGGUAN CITY WONDERFUL CERAMICS, Dongguan (CN); INDUSTRIAL PARK CO., LTD., Yichun (CN); 2. JIANGXI HEMEI CERAMICS CO., LTD., Yichun (CN)

( * ) Notice: Subject to any disclaimer, the term of this patent is extended or adjusted under 35 U.S.C. 154(b) by 0 days.

(21) Appl. No.: 17/380,119

(22) Filed: Jul. 20, 2021

(65) Prior Publication Data
US 2021/0350193 A1 Nov. 11, 2021

Related U.S. Application Data

(63) Continuation-in-part of application No. PCT/CN2019/092694, filed on Jun. 25, 2019.

(30) Foreign Application Priority Data

Apr. 22, 2019 (CN) .......................... 201910321734.2

(51) Int. Cl.
*G06K 19/06* (2006.01)
*B41J 3/407* (2006.01)

(52) U.S. Cl.
CPC ........ *G06K 19/06103* (2013.01); *B41J 3/407* (2013.01); *G06K 19/06037* (2013.01)

(58) Field of Classification Search
CPC .............. B41J 3/407; G06K 19/06037; G06K 19/06103; G06V 10/757
See application file for complete search history.

(56) References Cited

U.S. PATENT DOCUMENTS

2004/0138535 A1* 7/2004 Ogilvie .................... G07C 9/28
600/300
2007/0030521 A1* 2/2007 Fujii .................. H04N 1/32149
382/100
(Continued)

FOREIGN PATENT DOCUMENTS

| CN | 103730055 A | 4/2014 |
| CN | 106156320 A | 11/2016 |

(Continued)

OTHER PUBLICATIONS

International Search Report of PCT Patent Application No. PCT/CN2019/092694 dated Jan. 8, 2020.

*Primary Examiner* — Thien M Le

(57) ABSTRACT

The present disclosure relates to an anti-counterfeiting image code embedded in a decorative pattern of a ceramic tile and an anti-counterfeiting method thereof, the anti-counterfeiting image code is input into a terminal recognition software application. The anti-counterfeiting method includes steps of: (1) embedding an image code into the decorative pattern of the ceramic tile; (2) inputting the decorative pattern on a surface of the ceramic tile into an image code generating software to generate the image code that can be decoded, editing a ceramic tile parameter and (Continued)

ceramic tile information in the image code generating software; (3) packing the image code and inputting it into a terminal recognition software application; (4) downloading the terminal recognition software application at a mobile terminal; and (5) opening an application to initiate a code scanner and capturing a image or a pre-taught partial feature image.

7 Claims, 2 Drawing Sheets

(56) References Cited

U.S. PATENT DOCUMENTS

| | | | |
|---|---|---|---|
| 2007/0086060 A1* | 4/2007 | Chiba | H04N 1/32288 358/540 |
| 2010/0143827 A1* | 6/2010 | Horgan | G01N 21/4788 359/2 |
| 2011/0087539 A1* | 4/2011 | Rubinstein | G06Q 30/0276 235/375 |
| 2013/0212046 A1* | 8/2013 | Henshue | B44C 5/0446 427/256 |
| 2013/0335783 A1* | 12/2013 | Kurtz | G06K 1/121 358/3.28 |
| 2016/0267493 A1* | 9/2016 | Liu | G06K 19/06037 |
| 2018/0121933 A1* | 5/2018 | Chen | H04L 9/302 |
| 2018/0330135 A1* | 11/2018 | Suman | G06K 7/10881 |

FOREIGN PATENT DOCUMENTS

| | | |
|---|---|---|
| CN | 106599961 A | 4/2017 |
| CN | 106599962 A | 4/2017 |

\* cited by examiner

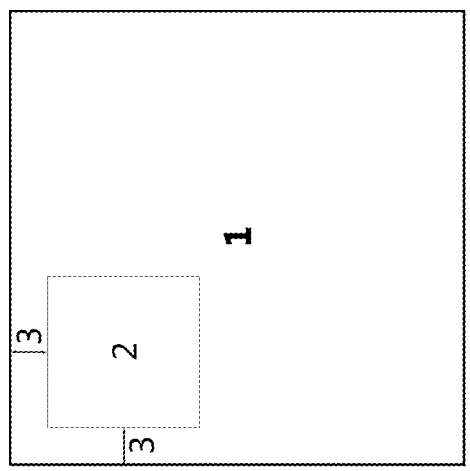

ANTI-COUNTERFEITING IMAGE CODE EMBEDDED IN A DECORATIVE PATTERN OF A CERAMIC TILE AND ANTI-COUNTERFEITING METHOD THEREOF

CROSS REFERENCE TO RELATED APPLICATIONS

The present application is a Continuation-In-Part Application of PCT Application No. PCT/CN2019/092694 filed on Jun. 25, 2019, which claims the benefit of Chinese Patent Application No. 201910321734.2 filed on Apr. 22, 2019. All the above are hereby incorporated by reference in their entirety.

TECHNICAL FIELD

The present disclosure relates to the field of ceramic anti-counterfeiting, in particular, to an anti-counterfeiting image code embedded in a decorative pattern of a ceramic tile and an anti-counterfeiting method thereof.

BACKGROUND

The ceramic industry belongs to traditional industries. After decades of development in our country, architectural ceramics have many large and small brands, abundant terminal products, and excellent quality. However, as the market becomes more standardized and mature, especially under the multiple pressures of the state's regulation of real estate, supply-side reforms, urbanization, capacity reduction, environmental protection, and workers, the architectural ceramic industry is facing unprecedented challenges. Under the background of this big environment, various architectural ceramics companies have paid more attention to and invested in products and terminals, striving to lead the trend and occupy the market with new products having various functions and decorative effects as soon as possible. However, as long as a new product succeeds in the market terminal, the entire industry will follow suit, and the homogeneity will be very serious. This kind of following the trend has not only stayed in the color of the product itself, but also terminal sale tools, sale methods, sale techniques, etc., and even further eroded many products with various patented technologies. Therefore, before the new product is launched on the market, if an anti-counterfeiting mark can be injected into the product, the more authentic the product imitated by the counterfeiter, the more sufficient evidence can be found to prove that the product it produces is a counterfeit. This can protect companies that have invested more in new technologies, new processes and new product development, and made progress to obtain their due return on R&D investment. This can also make industry competition benign and make positive contributions to the healthy development of the industry. At present, ceramic tiles are mostly set up with corporate brand trademark patterns at the bottom, which is easy to be copied, and once the ceramic tiles are paved, it is difficult to identify their authenticity. At the bottom of the green body of the ceramic tile, the manufacturer's brand or trademark is imprinted, or the code is printed on the periphery of the ceramic tile with a coding machine, which requires a lot of input. When it comes to rework and return, the product with the information input needs to be re-coded and input, which is cumbersome and error-prone. Moreover, after reaching the terminal in this way, it is easy for counterfeiters to use the corresponding tools and equipment to deliberately wear, destroy or imitate, but it is difficult to find direct evidence to identify the authenticity of the product, causing problems such as selling skewed goods. Another is to directly paste the anti-counterfeiting mark on the surface of the tile. On the one hand, it affects the decorative effect of the surface of the ceramic tile. At the same time, the durability of the mark is not high. It is easy to remove the anti-counterfeiting mark and lose the anti-counterfeiting function. Other existing logo anti-counterfeiting technologies, such as laser labeling, color printing labeling, watermarking, digital scratching, telephone inquiry, and other methods have disadvantages such as inconvenience, a high cost, a diminishing effect, and a difficulty in popularization.

CN103730055A discloses an anti-counterfeiting mark printed on a ceramic surface. Its purpose is to provide an anti-counterfeiting mark that can meet the requirements for embedding and identifying the anti-counterfeiting mark in a specific application environment. At the same time, through the combination of the anti-counterfeiting technology of a two-dimensional dot matrix pattern, which is difficult to copy and scan, and the ceramic anti-counterfeiting technology, the anti-counterfeiting mark is read and extracted by different spectral information and embedded into a two-dimensional dot matrix graphic code. Wherein, the invisible anti-counterfeiting mark is invisible to the naked eye and printed on the ceramic surface. The technical solution: the anti-counterfeiting mark printed on the ceramic surface is made of electronic graphics in a specific format as the printing source. The electronic graphics are generated by certain coding rules as the basic rules, and have certain graphics parameter planning. The electronic graphics generated by a certain coding rule have logic, can store a certain amount of information, and can be calculated. The electronic graphics are cured on the printing plate through process steps of plate making, and printing operation is carried out. The anti-counterfeiting mark is printed on a printing medium. The ink used in printing is a special transfer printing ink. The ink is required to contain a light-absorbing material that can absorb infrared rays, and its content must meet a minimum absorption requirement of the ink. The printing medium of the anti-counterfeiting mark is a smooth ceramic surface. The printed anti-counterfeiting mark can be correctly read by specific anti-counterfeiting identification equipment. Therefore, it is a kind of anti-copy and anti-cracking curing mark transferred on the ceramic surface by a special ink and a special printing method. The mark can be recognized by an identification instrument, and the anti-counterfeiting information stored in the anti-counterfeiting mark can be extracted, so as to achieve the purpose of the anti-counterfeiting mark to determine the authenticity of the ceramic article. Its shortcomings are: this method a requires special ink and a special printing method to print on the ceramic surface, so as to decorate and cover the surface pattern of the ceramic tile; if each ceramic tile is treated in this way, its decorative effect is very inconsistent with a usage habit, and there is no aesthetic feeling of decorative materials, which will seriously affect the original decorative function of the ceramic tile.

SUMMARY OF THE DISCLOSURE

The objective of the present disclosure is to provide an anti-counterfeiting image code embedded in a decorative pattern of a ceramic tile. The anti-counterfeiting image code mashes up the image code having a camouflage effect and the tile texture to make the image code a part of the decorative pattern of the ceramic tile. Ceramic tiles with different textures and patterns are embedded with different image codes, which will not affect the surface appearance and decorative performance of ceramic products. The anti-counterfeiting image code is not easy to be destroyed deliberately, and has a unique anti-counterfeiting effect. Another objective of the present disclosure is to provide an anti-counterfeiting method of embedding an anti-counterfeiting image code in a decorative pattern of a ceramic tile. The method comprises the steps of downloading an application (APP) with an identification function at a mobile terminal, opening an application to initiate a code scanner, and aiming for the ceramic tile that a user wishes to know to capture a completed image or a pre-taught partial feature image; a decoding software automatically makes a comparison with an image in a database to decode; after the decoding is passed, the decoding software automatically jumps to a page to retrieve various process parameters and information of the ceramic tile for a consumer's reference.

The technical solution of the present disclosure is the anti-counterfeiting image code embedded in a decorative pattern of a ceramic tile. Its special feature is that the decorative pattern or part of the decorative pattern is made into the anti-counterfeiting image code that can be identified, and the anti-counterfeiting image code is input into a terminal recognition software application (APP).

As a preferred embodiment, image codes of new ceramic tiles are continuously added to a database of the terminal recognition software application (APP) to continuously update the database, and disused image codes are cleared from the database.

As a preferred embodiment, the image code comprises parameter information of the ceramic tile, so that product information hidden in the image code can be read and collected by a scanner after recognition.

As a preferred embodiment, a large and complete graph design is pre-divided according to a pattern; that is, a complete design graph is pre-divided into a plurality of fixed patterns, a desirable number of patterns are printed by an inkjet printer according to predetermined and pre-divided patterns to facilitate fabrication of an image code at a later stage.

As a preferred embodiment, an imported image is converted to a two-dimensional image code by an image code generating software; the image code generating software is a background online software that has functions of converting the decorative pattern to a corresponding two-dimensional dotted pattern, editing, storing, and exporting.

As a preferred embodiment, information contained in the two-dimensional image code comprises a decorative pattern and text information of the ceramic tile, wherein the text information comprises a description of a source of inspiration, a design concept, a production process, pattern number and area, a decoration guideline, paving and use precautions, and an user opinion.

Another objective of the present disclosure is to provide an anti-counterfeiting method of embedding the anti-counterfeiting image code in a decorative pattern of a ceramic tile. Its special feature is that it comprises the following steps:

(1) embedding an image code into the decorative pattern of the ceramic tile such that the image code is integrated into the decorative pattern of the ceramic tile; the image code comprises a hidden function and hidden information and can be decoded;

(2) inputting the decorative pattern on a surface of the ceramic tile into an image code generating software to generate the image code that can be decoded, editing a ceramic tile parameter and ceramic tile information in the image code generating software;

(3) packing the image code and inputting it into a terminal recognition software application (APP);

(4) downloading the terminal recognition software application (APP) at a mobile terminal; and (5) opening an application (APP) to initiate a code scanner, aiming for the ceramic tile that a user wishes to know to capture a completed image or a pre-taught partial feature image; a decoding software automatically makes a comparison with an image in a database to decode; after the image is decoded, the decoding software automatically jumps to a page to retrieve various process parameters and information of the ceramic tile for a consumer's reference.

As a preferred embodiment, image codes of new ceramic tiles are continuously added to a database of the terminal recognition software application, and the database is continuously updated; and disused image codes are selectively removed from the database.

Beneficial Effects (1) The image code of the present disclosure has a hiding function, and different product pattern designs have different image code information.

(2) The image code of the present disclosure does not affect the appearance of the product, does not change the production process platform of the existing ceramic tile, does not affect the decorative performance, and can even be a part of the product surface effect and decorative pattern.

(3) The ceramic tile with image code technology of the present disclosure has a unique anti-counterfeiting mark, which is not easy to be detected and not easy to be destroyed.

(4) The product with the image code technology of the present disclosure increases the difficulty of being counterfeited, enhances the anti-counterfeiting function of the product, and protects the interest of the manufacturer.

(5) Different series of products of the present disclosure have their own specific image codes, which improve the customer's understanding of product information and the ability to identify the authenticity of the product.

(6) The image code of the present disclosure has good camouflage and is not easy to be worn or deliberately destroyed.

(7) The barcode scanner of the present disclosure is easy to identify and read, and does not require special reading equipment. It only needs to download a professional application (APP) by the mobile terminal and register to obtain authorization.

(8) The terminal recognition software application (APP) of the present disclosure is a software system having its own identification function and installed on a mobile terminal. It is divided into two types: customer side and company side. After the customer downloads the APP, it needs to register, the registration information is transferred to the company port of the company headquarters, and the company checks the customer information and confirms whether it is authorized. The customer side of authorized terminal recognition software application (APP) has the identification function, can learn all kinds of information of the product, and distinguish the authenticity of the product.

BRIEF DESCRIPTION OF THE DRAWINGS

FIG. 2 is a schematic diagram of pattern position recognition adopted by the image code of the present disclosure;

Figure 1:
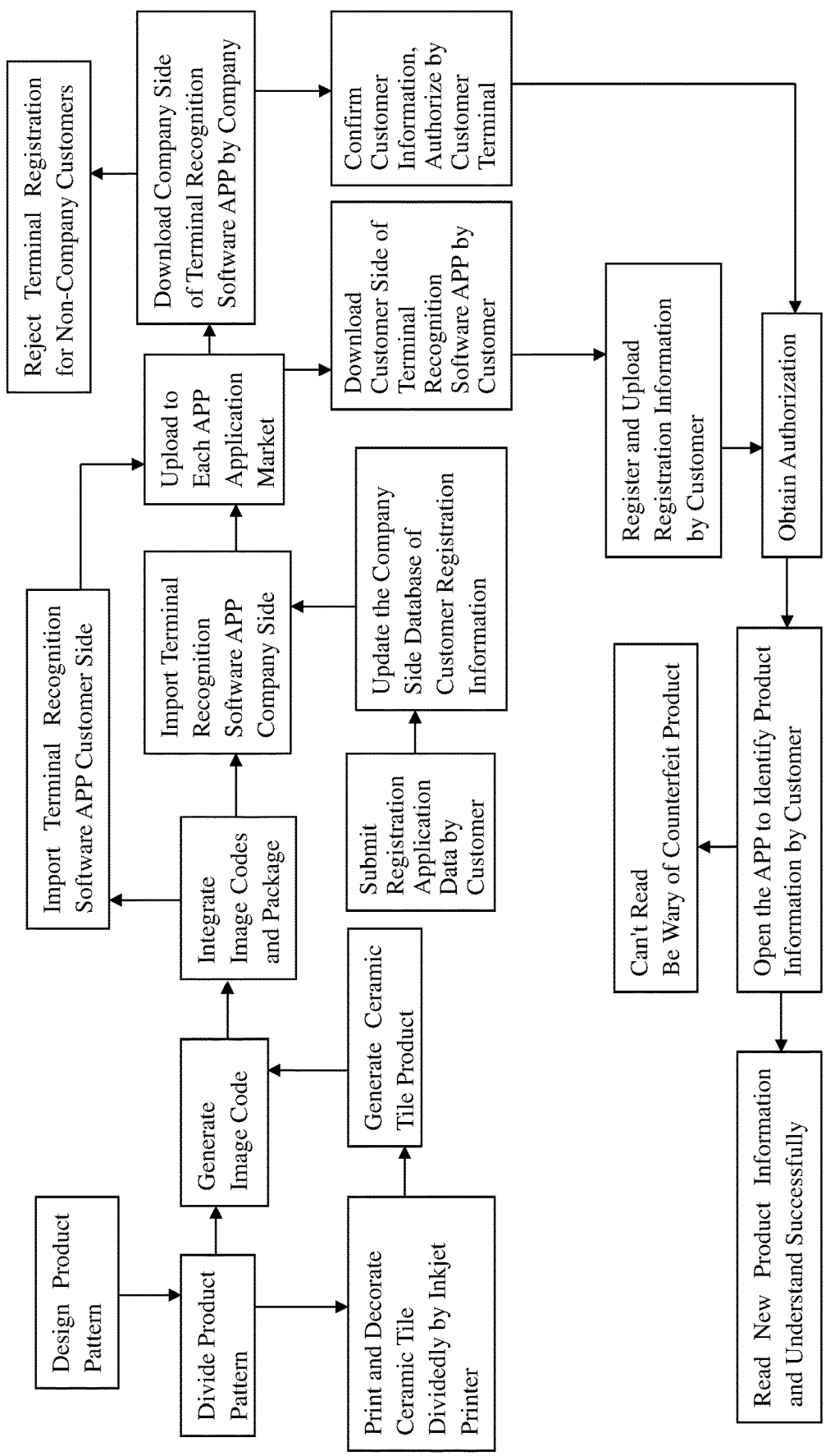
FIG. 1 is a flow chart of implementing the anti-counterfeiting operation method of the present disclosure.

wherein: 1 in FIG. 2 is the complete decorative pattern adopted by the image code; 2 in FIG. 2 is part of the decorative pattern adopted by the image code; 3 in FIG. 2 is the distance between the part of the decorative pattern adopted by the image code and the right-angle side of the ceramic tile, the distance can be equal or unequal, and the distance is not specified; the area of the part of the decorative pattern adopted is also not specified.

DETAILED DESCRIPTION OF PREFERRED EXAMPLES

The present disclosure will be further described below through drawings:

Please refer to FIG. 2, the anti-counterfeiting image code embedded in a decorative pattern of a ceramic tile comprises the decorative pattern or part of the decorative pattern made into the anti-counterfeiting image code that can be identified, the anti-counterfeiting image code is input into a terminal recognition software application (APP). The image code comprises parameter information of the ceramic tile, so that product information hidden in the image code can be read and collected by a scanner after recognition. Image codes of new ceramic tiles are continuously added to a database of the terminal recognition software application (APP) to continuously update the database, and disused image codes are cleared from the database.

The pattern division of the present disclosure is relative to a larger and more complete pattern design. Generally, the design draft size area of a ceramic tile is larger than the size of a single ceramic tile. For products that use digital inkjet printing, when a complete pattern is used to let the digital inkjet printer randomly select part of the pattern to print, the pattern is not fixed, and the collected pattern has great variability. This is not convenient for fabrication of an image code at a later stage. Therefore, a complete design graph is pre-divided into a plurality of fixed patterns. A desirable number of patterns are printed by an inkjet printer according to predetermined and pre-divided patterns to facilitate fabrication of the image code at a later stage.

The part of the product decoration pattern refers to a part of the pattern texture intercepted in the single product pattern. For example, from the area 10 cm away from two right-angle sides of the ceramic tile, a fixed size area of the decoration pattern is randomly intercepted to fabricate the image code. The parameter of the specific distance from the right-angle side of the ceramic tile is not specified, and the area of the pattern intercepted is also not specified. Only when it is necessary to fabricate the image code, provisional regulations can be made according to different product textures.

The anti-counterfeiting function of the present disclosure means that the image code itself is not only a pattern, but also contains a certain amount of product process manufacturing parameters and usage information. Both the company side and the customer side that use special terminal recognition software application (APP) can read and collect product information hidden in the image code. The surface pattern of the imitation product is not clear enough, and the pattern information is lost and incomplete. In order to confuse consumers, the product pattern will be partially modified to show the difference. This kind of counterfeit product, whose original pattern information is modified and lost, cannot be recognized by the terminal software, so that the authenticity of the product can be identified.

An imported image is converted to a two-dimensional image code by an image code generating software; the image code generating software is a background online software that has functions of converting the decorative pattern to a corresponding two-dimensional dotted pattern, editing, storing, and exporting.

The information contained in the two-dimensional image code comprises a decorative pattern and text information of the ceramic tile, wherein the text information comprises a description of a source of inspiration, a design concept, a production process, pattern number and area, a decoration guideline, paving and use precautions, and an user opinion.

Please refer to FIG. 1, an anti-counterfeiting method of embedding an anti-counterfeiting image code in a decorative pattern of a ceramic tile, the method comprises steps of:

(1) dividing a new ceramic tile pattern to be promoted into corresponding product sizes, and counting the quantity;

(2) making all the divided design patterns into a ceramic tile by inkjet printing and a ceramic tile manufacturing method;

(3) inputting all the decorative patterns on a surface of the ceramic tile or the original design draft corresponding to the ceramic tile pattern into an image code generating software, making complete patterns or part of the complete patterns of all products in the new series into image codes that can be decoded, meanwhile, editing various parameter information of this series of products in the image code generating software; embedding an image code into the decorative pattern of the ceramic tile such that the image code is integrated into the decorative pattern of the ceramic tile, so that the consumer can read and understand the product information after a code scanner recognizes it; the image code comprises a hidden function and hidden information and can be decoded;

(4) packing all the image codes of the series of products with product information, and inputting them into the terminal recognition software application (APP); subsequent image codes of new ceramic tiles can be continuously added to a database of the terminal recognition software application (APP), and the database is continuously updated; and image codes of disused ceramic tiles are selectively removed from the database;

(5) downloading a customer side of terminal recognition software application (APP) by a customer; registering and uploading registration information by the customer to obtain authorization, opening an application (APP) to initiate a code scanner by the customer, aiming for the ceramic tile that a user wishes to know to capture a completed image or a pre-taught partial feature image; and (6) automatically making a comparison with an image in a database to decode by a decoding software; after the decoding is passed, the decoding software automatically jumps to a page to retrieve various process parameters and information of the ceramic tile for a consumer's reference; if it cannot be read, it is determined to be a counterfeit product.

The descriptions above are only the preferred examples of the present disclosure, and the specific examples above do not limit the present disclosure. Various variations and modifications can occur within the scope of the technical idea of the present disclosure; all embellishments, modifications or equivalent replacements made by those of ordinary skill in the art according to the descriptions above fall within the protection scope of the present disclosure.

What is claimed is:

1. An anti-counterfeiting image code embedded in a decorative pattern of a ceramic tile, wherein the decorative pattern or part of the decorative pattern is made into the anti-counterfeiting image code that can be identified, and the anti-counterfeiting image code is input into a terminal recognition software application, and
wherein image codes of new ceramic tiles are continuously added to a database of the terminal recognition software application to continuously update the database, and disused image codes are cleared from the database.

2. The anti-counterfeiting image code according to claim 1, wherein the image code comprises parameter information of the ceramic tile, so that product information hidden in the image code can be read and collected by a scanner after recognition.

3. The anti-counterfeiting image code according to claim 1, wherein a large and complete graph design is pre-divided according to a pattern; that is, a complete design graph is pre-divided into a plurality of fixed patterns, a desirable number of patterns are printed by an inkjet printer according to predetermined and pre-divided patterns to facilitate fabrication of an image code at a later stage.

4. The anti-counterfeiting image code according to claim 1, wherein an imported image is converted to a two-dimensional image code by an image code generating software; the image code generating software is a background online software that has functions of converting the decorative pattern to a corresponding two-dimensional dotted pattern, editing, storing, and exporting.

5. The anti-counterfeiting image code according to claim 4, wherein information contained in the two-dimensional image code comprises a decorative pattern and text information of the ceramic tile, wherein the text information comprises a description of a source of inspiration, a design concept, a production process, pattern number and area, a decoration guideline, paving and use precautions, and an user opinion.

6. An anti-counterfeiting method of embedding an anti-counterfeiting image code in a decorative pattern of a ceramic tile, wherein the method comprises steps of:
   (1) embedding an image code into the decorative pattern of the ceramic tile such that the image code is integrated into the decorative pattern of the ceramic tile; the image code comprises a hidden function and hidden information and can be decoded;
   (2) inputting the decorative pattern on a surface of the ceramic tile into an image code generating software to generate the image code that can be decoded, editing a ceramic tile parameter and ceramic tile information in the image code generating software;
   (3) packing the image code and inputting it into a terminal recognition software application;
   (4) downloading the terminal recognition software application at a mobile terminal; and
   (5) opening an application to initiate a code scanner, aiming for the ceramic tile that a user wishes to know to capture a completed image or a pre-taught partial feature image; a decoding software automatically makes a comparison with an image in a database to decode; after an image is decoded, the decoding software automatically jumps to a page to retrieve various process parameters and information of the ceramic tile for a consumer's reference.

7. The anti-counterfeiting method according to claim 6, wherein
image codes of new ceramic tiles are continuously added to a database of the terminal recognition software application, and the database is continuously updated; and image codes of disused ceramic tiles are selectively removed from the database.

* * * * *

UNITED STATES PATENT AND TRADEMARK OFFICE
CERTIFICATE OF CORRECTION

PATENT NO. : 11,521,033 B2
APPLICATION NO. : 17/380119
DATED : December 6, 2022
INVENTOR(S) : Jiaqi Huang et al.

Page 1 of 1

It is certified that error appears in the above-identified patent and that said Letters Patent is hereby corrected as shown below:

On the Title Page

In Item (73) Assignees data, the correct data of the 1st assignee Column 1, Line 2 should be: "DONGGUAN CITY WONDERFUL CERAMICS INDUSTRIAL PARK CO., LTD., Dongguan (CN)".

In Item (73) Assignees data, the correct data of the 2nd assignee Column 1, Line 4 should be: "JIANGXI HEMEI CERAMICS CO., LTD., Yichun (CN)".

Signed and Sealed this
Twenty-seventh Day of August, 2024

Katherine Kelly Vidal
*Director of the United States Patent and Trademark Office*